Aug. 21, 1934.  L. LHOEST  1,971,110
TRANSFERRING APPARATUS FOR INCOMPLETELY
SOLIDIFIED GLASS BOTTLES AND THE LIKE
Filed April 24, 1933
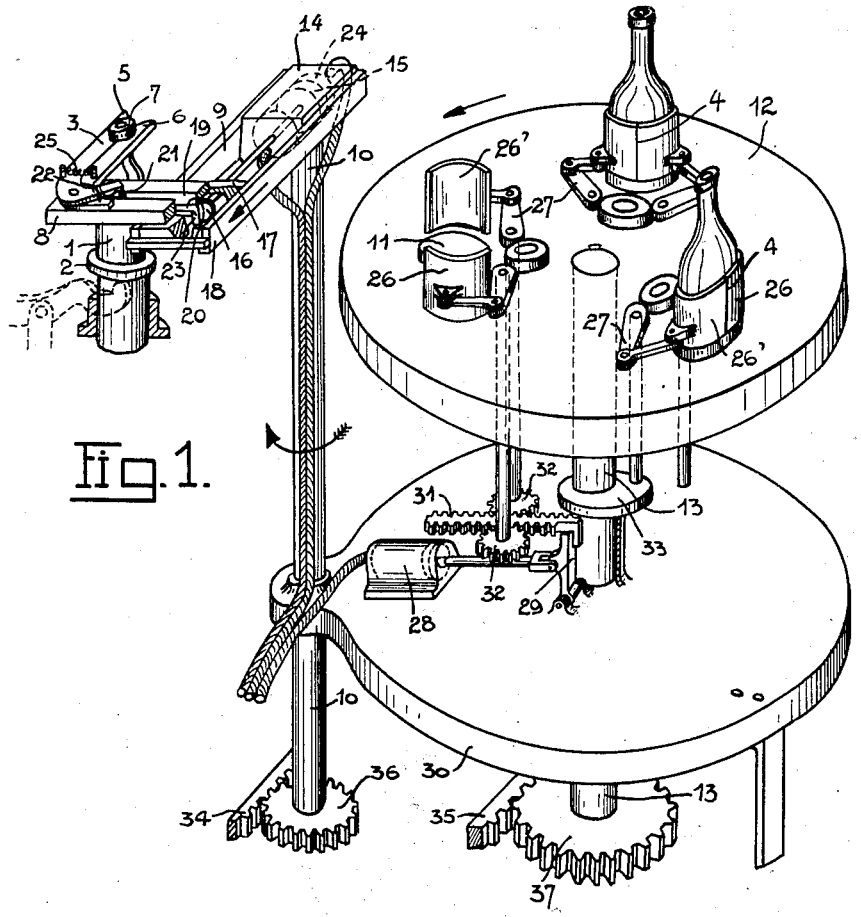

Patented Aug. 21, 1934

1,971,110

UNITED STATES PATENT OFFICE 1,971,110

TRANSFERRING APPARATUS FOR INCOMPLETELY SOLIDIFIED GLASS BOTTLES AND THE LIKE

Léon Lhoest, Merxem-by-Antwerp, Belgium

Application April 24, 1933, Serial No. 667,695
In Belgium April 25, 1932

3 Claims. (Cl. 49—14)

The present invention relates to a rotary transferring apparatus for incompletely solidified glass bottles and the like comprising a grip with movable jaws mounted on an arm horizontally swinging about a vertical axis parallel to the axis of the partible blow mold of an automatic blowing machine.

The object of the present invention is to provide a simple and strong apparatus of the class designed whereby the bottle may be extracted from the blow mold across the clear space between the open halves of the mold by a rectilinear horizontal motion of the grip at right angles to the vertical axis of the mold.

For this purpose the grip is mounted on the swinging arm, by means of the mechanism as hereafter described so as to be able to slide on said arm in the plan of rotation thereof, after the grip has been actuated to close or to open and before the arm has been swung towards or from the table.

Another object of the invention is to prevent the swinging arm of the apparatus from being hooked by the bottle released by the grip.

A further object of the invention is to provide a partible receiver in which a bottle may be placed even if its base is of larger section than the rest of it.

Other novel features of construction and arrangement of parts will appear from the following description.

Fig. 1 shows a diagrammatic view of one form of embodiment of the invention.

Fig. 2 shows diagrammatically an alternative construction of the rotating arm together with the parts which it supports, a part of the mechanism being cut away.

By leaving the automatic machine the bottle 1 is lodged in a blow mold, of which only the vertically sliding bottom part 2 is diagrammatically shown in Figure 1.

The transferring apparatus according to the invention is designed to transfer this bottle, the glass of which is still soft, without it sustaining harmful deformation of any sort during its extracting from the mold and during the transfer. The bottle 1 is seized when in the blow mold and transferred by means of the grip 3, which holds it freely and vertically suspended.

For this purpose the grip 3 comprises two relatively movable jaws 5 and 6, which can be operated, so as to seize the bottle 1 under the collar of the neck 7 and to release it at the opportune moment over a receiver 4 mounted on a table 12 carried by a rotatable shaft 13. The bottle will remain in this receiver for a predetermined length of time, in order to attain a sufficient degree of solidity and to be further finished off. The above mentioned grip is carried by a carrier 8 fitted to a horizontal movable arm 9 rigidly secured to a vertical shaft 10, which is parallel to the longitudinal axis of the blow mold 2 and this shaft 10 can be rotated by any convenient means so as to transfer the bottle 1 towards and above one of vertically movable bases pieces 11 mounted on the rotating table 12.

With a view to preventing damage to the bottle, by impact with the edges of the halves of the mold when it leaves the latter and to reduce to a minimum the opening of the mold, the transferring apparatus according to the invention removes the bottle across the free space between the halves of the opened mold, by transferring the bottle perpendicularly to the vertical axis of the same and previously to any angular displacement of the arm 9. For this purpose the grip-carrier 8 is adapted to slide on the swinging arm 9 in the plan of rotation of the latter and to make a rectilinear movement perpendicular to the axis of the mold 2 before the arm 9 has been swung towards the rotating table.

In order to obtain this result the movements of the jaws 5 and 6 as well as the displacements of the grip-carrier 8 are successively controlled by one and the same device.

The swinging arm 9 carries a compressed air cylinder 14, the piston 15 of which is rigidly connected to a movable reciprocating member to one end of which is secured a pusher 16 housed in a chamber provided in a carriage 17 adapted to slide on rails 18 secured to the cylinder 14. According to the invention, the length of the chamber in the carriage 17, in which the pusher 16 slides, is less than the full stroke of the piston 15. The grip-carrier 8 is rigidly fixed to the sliding carriage 17 and comprises a housing 19 for a sliding rod 20. One end of this rod carries a nose-piece 21 which can be pushed between the operating arms 22 prolonging the jaws of the grip 3, thereby causing them to open against the action of a closure spring 25, which normally tends to push the rod so as to make its other end 23 project into the path of the pusher 16 in the carriage.

The transferring apparatus operates as follows: When the grip 3, consequent upon the rotation of the arm 9, reaches the blowing machine in front of the mold, the compressed air acting on the piston 15 causes the pusher 16 to move towards the shaft 10. The pusher first moves the nose piece 23 laterally, which causes the grip 3 to open against the action of the spring 25. It then causes the carriage 17 itself to move towards the shaft 10, thereby bringing the jams 5 and 6 of the opened grip 3 to either side of the neck 7 of the bottle. The air pressure admitted at this moment on the face 24 of the piston 15, causes the pusher 16 to start its return movement in the direction of the arrow. As soon as the pusher 16 has passed the nose piece 23 the spring 25 closes the grip 3, which has just been opened, around the neck of the bottle resting on the bottom 2 of the mold, and the pusher 16 acts again on the carriage 17 so as to move the latter towards the free end of the arm 9 in the direction of the arrow, so that the grip 3 which, on closing, has seized the bottle, withdraws the latter from the blow mold by transferring it across the free space between the open halves of the mold.

After the rotating arm 9 has conveyed the bottle over the rotating table 12, the pusher 16 returns some way towards the shaft 10, so that grip 3 opens again; and releases the bottle which is thus placed on the base piece 11 mounted on the rotary table 12 which then begins to rotate.

In order to prevent the arm 9 from being hooked by the bottle resting on the rotating table 12, according to the present invention the arm 9 is lifted after the grip 3 has been opened so as to become placed over the plan of rotation of the arm 9.

This lifting of the arm 9 may be obtained by any suitable means, such as a mechanism operated by compressed air.

When the bottle has been moved by the table 12 from under the arm 9 the latter is lowered again and the pusher 16 is moved back by the piston 15 towards the free end of the arm 9. This allows the grip 3 to be closed, whilst the carriage 17 remains in its extreme position towards the free end of the arm 9. The arm 9 then returns towards the mold, and when it is situated in front of the latter, the piston 15 is again operated by compressed air, and the cycle of operations begins anew.

The bottle released by the grip 3 is held in place on the table 12 by means of two movable curved plates 26 and 26', which, when brought together, form the receiver 4. The receiver is adapted to open before it is brought under the grip 3, by the table 12, so that a bottle can be placed in the receiver even if its base is of larger section than the rest of it.

For this purpose, each plate of the receiver is hinged to a carrier 27 operated in the following manner: a blowing machine admits compressed air into the cylinder 28, the piston of which tilts a lever 29 hinged to a fixed supporting table 30. In tilting the top end of this lever 29 engages the rack 31, fitted on the lower side of the table 12 and meshing with two pinions 32, the shafts of which support the carriers 27. The displacement of the rack 31 by the lever 29 thus causes the receiver 4 to open.

During the rotation of the table 12, when the rack 31 passes in front of a cam 33 secured to the supporting table 30, it is moved back towards the periphery of the table 12 so as to open the receiver 4 and the bottle, which is now sufficiently cooled, is tipped out by the base piece 11 in a known manner.

For the sake of clearness the rack 31 and the pinions 32, which are in practice mounted on the lower face of the table 12, are shown in Fig. 1 a certain distance away from this table.

In order to coordinate the movements of the table 12 with those of the arm 9 their movements are controlled by the blowing machine, for instance, by means of compressed air acting on pistons not shown in the drawing, such pistons being connected to the racks 34 and 35 which actuate respectively the pinions 36 and 37 keyed respectively to the shafts 10 and 13.

Fig. 2 shows another embodiment of the swinging arm 9. In this embodiment the sliding carriage 17 which carries the grip 3 is shown in the position which it occupies, before the grip, already brought into position between the halves of the opened mold, have seized the bottle.

In this embodiment the pusher 16 of a tapered form cooperates with the rod 20 in order to open the jaws 5 and 6. The carriage 17 is constructed so as to slide on a central guide bar 38 rigidly secured to the rotating shaft 10.

From the above description it will clearly be seen that the transferring apparatus according to the invention, in which the swinging movement of the arm is combined with the extraction of the bottle from the mold by a rectilinear displacement of the bottle overcomes the risk of damage to the bottle on its removal from the mold, whilst limiting to the strictest minimum the opening of the halves of the mold.

Furthermore, it allows bottles of any size or form, be they of taper or irregular shape, to be mechanically transferred from the mold of the automatic blowing machine to the point where they leave the receiver of the rotating table in a sufficiently coiled condition.

What is claimed and it is desired to secure by Letters Patent is:

1. A rotary transferring apparatus for incompletely solidified glass bottles or the like comprising in combination a horizontal arm swinging about a vertical shaft parallel to the axis of the partible fixed blow mold of an automatic glass blowing machine, means for swinging said arm, a carriage slidably mounted on said arm, a carrier secured to said carriage, a grip carried by said carrier and having two movable jaws, a spring for closing said grip, a rod adapted to slide in said carrier so as to open said grip against the action of said spring, a movable member slidably reciprocating in said swinging arm and operating said rod so as to open said grip, and a chamber provided in said carriage, a pusher secured to one end of said movable member and slidably arranged in said chamber, a compressed air piston rigidly connected to the opposite end of said movable member, a nosepiece secured to said rod and projecting under the action of said spring into said chamber into the path of said pusher, the length of said chamber being less than the full stroke of said piston.

2. A rotary transferring apparatus for incompletely solidified glass bottles or the like comprising in combination a horizontal arm swinging about a vertical shaft parallel to the axis of the partible fixed blow mold of an automatic glass blowing machine, means for oscillating said arm from said mold to a rotary table, a carriage slidably mounted on said arm, a carrier secured to said carriage, a grip carried by said carrier and having two movable jaws, a spring for closing said grip, a rod adapted to slide in said carrier so as to open said grip against the action of said spring, a movable member slidably reciprocating in said swinging arm and operating said movable rod so as to open said grip, a chamber provided in said carriage, a pusher secured to one end of said movable member and slidably arranged in said chamber, a compressed air piston rigidly connected to the opposite end of said member, a nose-piece secured to said rod and projecting under the action of said spring into said chamber into the path of said pusher, the length of said chamber being less than the full stroke of said piston, a plurality of receivers mounted on said rotary table and means for lifting said swinging arm above the plane of rotation thereof after a bottle has been released by the grip above a receiver.

3. A rotary transferring apparatus for incompletely solidified glass bottles or the like comprising in combination a vertical shaft parallel to the axis of the partible fixed blow mold of an automatic glass blowing machine, a horizontal arm oscillating about said shaft from said mold to a rotary table, means for swinging said arm, a carriage slidably mounted on said arm, a carrier secured to said carriage, a grip carried by said carrier and having two movable jaws, a spring for closing said grip, a rod adapted to slide in said carrier so as to open said grip against the action of said spring, a movable member slidably reciprocating in said swinging arm and operating said rod so as to open said grip, a chamber provided in said carriage, a pusher secured to one end of said movable member and slidably arranged in said chamber, a compressed air piston rigidly connected to the opposite end of said movable member, a nose-piece secured to said rod and projecting under the action of said spring into said chamber into the path of said pusher, the length of said chamber being less than the full stroke of said piston, means for lifting said swinging arm above the plane of rotation thereof, a plurality of receivers mounted on said rotary table, each of said receivers comprising two movable curved plates adapted to be brought in spaced relationship one to other before a receiver has been brought by the rotating table under said grip.

LÉON LHOEST.